(12) United States Patent
Tian et al.

(10) Patent No.: US 8,738,839 B2
(45) Date of Patent: May 27, 2014

(54) METHOD AND DEVICE FOR STORING DATA IN SOLID STATE DISK (SSD) AND STORAGE MEDIUM STORING PROGRAMS TO PERFORM THE METHOD

(71) Applicant: Tencent Technology (Shenzhen) Company Limited, Guangdong (CN)

(72) Inventors: Ming Tian, Guangdong (CN); Jun Shu, Guangdong (CN); Weihua Chen, Guangdong (CN); Sihua Zhuang, Guangdong (CN); Huan Xiong, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 13/677,141

(22) Filed: Nov. 14, 2012

(65) Prior Publication Data

US 2013/0073782 A1 Mar. 21, 2013

Related U.S. Application Data

(63) Continuation of application No. PCT/CN2011/078965, filed on Aug. 26, 2011.

(30) Foreign Application Priority Data

Sep. 17, 2010 (CN) .......................... 2010 1 0287013

(51) Int. Cl.
*G06F 12/02* (2006.01)

(52) U.S. Cl.
USPC ........... 711/102; 711/103; 711/154; 711/167; 711/E12.008

(58) Field of Classification Search
None
See application file for complete search history.

(56) References Cited

U.S. PATENT DOCUMENTS

2010/0049902 A1* 2/2010 Kakihara et al. .............. 711/103
(Continued)

FOREIGN PATENT DOCUMENTS

| CN | 101398749 A | 4/2009 |
| CN | 101504625 A | 8/2009 |
| CN | 101699413 A | 4/2010 |

OTHER PUBLICATIONS

International Search Report, Dec. 1, 2011.

(Continued)

*Primary Examiner* — Michael Krofcheck
(74) *Attorney, Agent, or Firm* — Morris Manning & Martin LLP; Tim Tingkang Xia, Esq.

(57) ABSTRACT

The invention discloses a method for storing data and a device of implementing the same. The method comprises receiving a request for storing data sent by a user and storing the data to an SSD according to the received request. The device comprises a request receiving module used to receive the request storing data and an SSD storage module used to store the data to an SSD according to the received request. The invention ensures consistency of data storage by storing data to an SSD according to the received request, thereby reducing data redundancy caused by using a cache layer to cache the data in the prior art. Additionally, the use of a single layer of an SSD to store data avoids the need of reloading data in the cache layer once a machine is power-down, thereby reducing the complexity of system design and the cost of operation and maintenance.

12 Claims, 4 Drawing Sheets

(56) References Cited

U.S. PATENT DOCUMENTS

2010/0082882 A1* 4/2010 Im et al. .................. 711/103
2012/0047287 A1* 2/2012 Chiu et al. ................ 710/8
2012/0191702 A1* 7/2012 Musial et al. ............. 707/719

OTHER PUBLICATIONS

Written Opinion of the International Searching Authority, Dec. 1, 2011.
International Preliminary Report on Patentability, Mar. 19, 2013.

* cited by examiner

METHOD AND DEVICE FOR STORING DATA IN SOLID STATE DISK (SSD) AND STORAGE MEDIUM STORING PROGRAMS TO PERFORM THE METHOD

CROSS-REFERENCE TO RELATED PATENT APPLICATION

This application is a continuation application of an International Application No. PCT/CN2011/078965, filed Aug. 26, 2011, entitled "METHOD AND DEVICE FOR STORING DATA," by Ming Tian et al., which claims the priority from the Chinese patent application No. 201010287013.3, filed Sep. 17, 2010, entitled "METHOD AND DEVICE FOR STORING DATA", by Ming Tian et al., the disclosures for which are hereby incorporated herein in their entireties by reference.

FIELD OF THE INVENTION

The present invention relates generally to data storage technology, and more particularly to a method and a device for storing data in a solid state disk (SSD).

BACKGROUND OF THE INVENTION

User-generated content (UGC) covers a range of media content available in a range of modern communications technologies, particularly in the world-wide web. A user creates his/her own content, uploads the content to the Internet, and displays or makes it available to users through the Internet. The user can also edit or modify the content currently exist in a website. The introduction of UGC makes it possible for the transition from download only operation mode to download and upload parallel operation mode of the internet. With the development of the global Internet business and Internet Commerce, UGC services become more and more popularly used by Internet users worldwide. Social networking, audio/video sharing, and blogs, are a few examples of UGC application form, and these applications create huge amount of data, as well as large amount random data access (reads and writes). These applications also create inevitable problems such as how to store the data, and how to access simultaneously the data.

Currently, a multi-layered structure is used to store data created by UGC, including: Cache (high speed buffer memory) Layer and Data Layer. The Cache Layer uses internal RAM, buffers recent data most frequently accessed, and removes data less frequently accessed. The Data Layer uses disks to store all of the data.

The existing technical solution has following issues:

(1) Data consistency issue: existing technical solution uses hierarchical structure to store data, and when a user updates the data, the user has to synchronize modifications to the data in the Cache Layer and the data in the Data Layer. If the data in both layers are not properly synchronized, data inconsistencies may occur between the data in the Cache Layer and the data in the Data Layer;

(2) Cost issue: the data most frequently accessed in the Cache Layer also needs to be stored in the Data Layer, which is redundant, and leads to additional costs.

(3) Reliability issue: due to memory data volatility, once a server of the Internet website loses power either intentionally or inadvertently, the data stored in the Cache Layer is lost and it has to be reloaded after the power is back on. When the Cache Layer is in the process of reloading data, external request is likely to be affected, and access to the data in the Data Layer will likely to increase the load on the Data Layer;

(4) Design complexity issue: to resolve or alleviate as far as possible the issues listed above, design of the system as a whole can become more complex; and (5) Operation and maintenance-related issue: the factors listed above also will increase the costs of website operation and maintenance.

Therefore, heretofore unaddressed needs exist in the art to address the aforementioned deficiencies and inadequacies.

SUMMARY OF THE INVENTION

In order to ensure the consistency of data storage, reduce data redundancy caused by using a cache layer to cache data in the prior art, avoid the need of reloading data in the cache layer once a machine is power-down, and thus avoid increases of external requests and accesses to data layers caused by reloading data, and reduce the complexity of system design and the cost of operation and maintenance, the invention provides a method for storing data and a device of implementing the same.

In one aspect of the invention, a method for storing data includes the steps of receiving a request for storing data sent by a user, and storing the data in a solid state disk (SSD) according to the received request.

In another aspect of the invention, a device for storing data includes a receiving module for receiving a request for storing data sent by from a user, and an SSD storage module for storing the data in an SSD according to the received request.

In yet another aspect of the invention, a computer-readable medium storing instructions which, when executed by a processor, cause a computer to perform a method for storing data, which comprises receiving a request for storing data sent by a user; and storing the data in a solid state disk (SSD) according to the received request.

According to the invention, the consistency of data storage is ensured by storing data to an SSD according to the received request for storing the data, thereby reducing data redundancy caused by using a cache layer to cache data in the prior art. Additionally, the use of a single layer of an SSD to store data avoids the need of reloading data in the cache layer once a machine is power-down, and thus avoids increases of external requests and accesses to data layers caused by reloading data, thereby reducing the complexity of system design and the cost of operation and maintenance.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWING

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the invention.

DETAILED DESCRIPTION OF THE INVENTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising", "including", "having", "containing", "involving" and the like are to be understood to be open-ended, i.e., to mean including but not limited to.

The description will be made as to the embodiments of the present invention in conjunction with the accompanying drawings in FIGS. 1-4. In accordance with the purposes of this invention, as embodied and broadly described herein, this invention, in one aspect, relates to a method for storing data in an SSD according to the request for storing data received from a user and a device of implementing the same.

Embodiment 1

Figure 1:
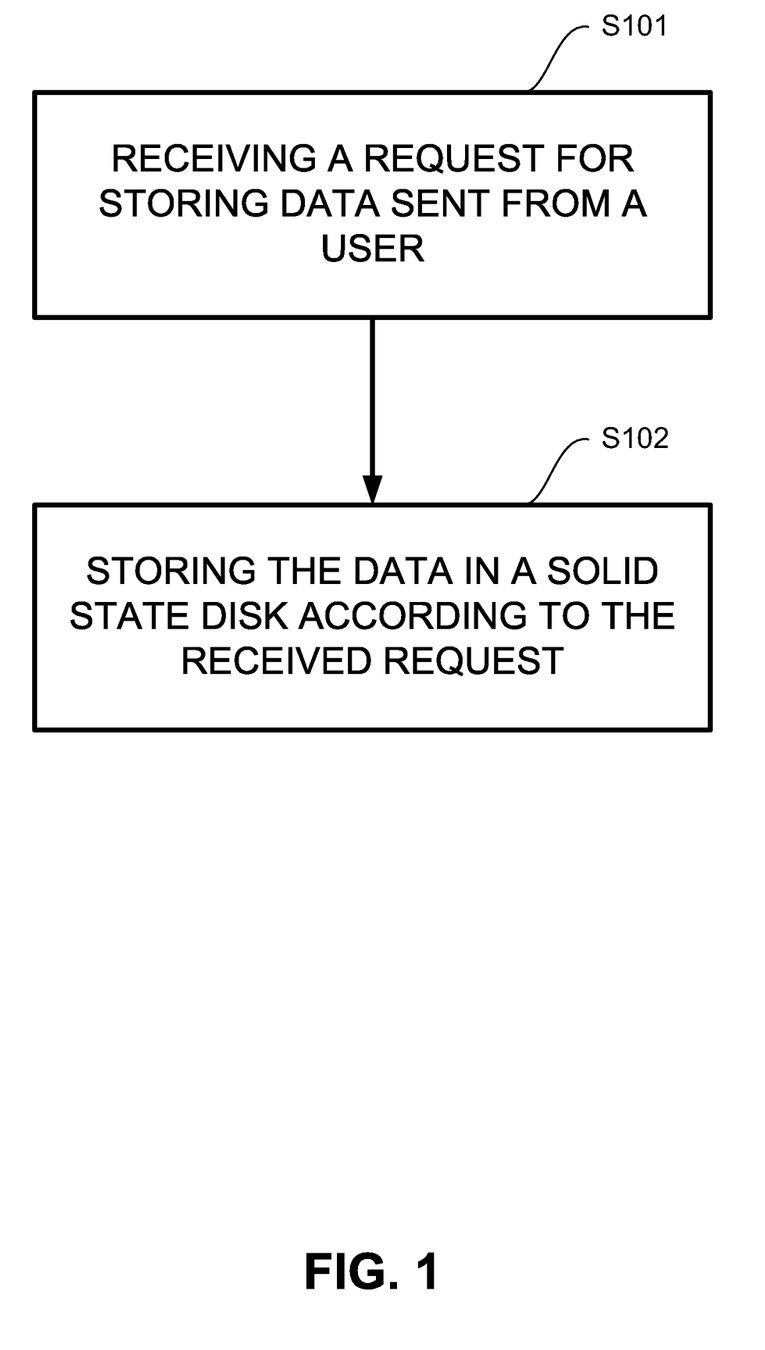
FIG. 1 is a flow chart showing a method for storing data according to one embodiment of the present invention.

Referring to FIG. 1, a method for storing data is shown according to the first embodiment of the invention. The method includes the following steps:

At step S101: a request for storing data sent by a user is received.

At step S102: the data is stored in a solid state disk (SSD) according to the received request.

According to the invention, the consistency of data storage is ensured by storing data to an SSD according to the received request, thereby reducing data redundancy caused by using a cache layer to cache data in the prior art. Additionally, the use of a single layer of an SSD to store data avoids the need of reloading data in the cache layer once a machine is power-down, and thus avoids increases of external requests and accesses to data layers caused by reloading data, thereby reducing the complexity of system design and the cost of operation and maintenance.

Embodiment 2

Figure 2:
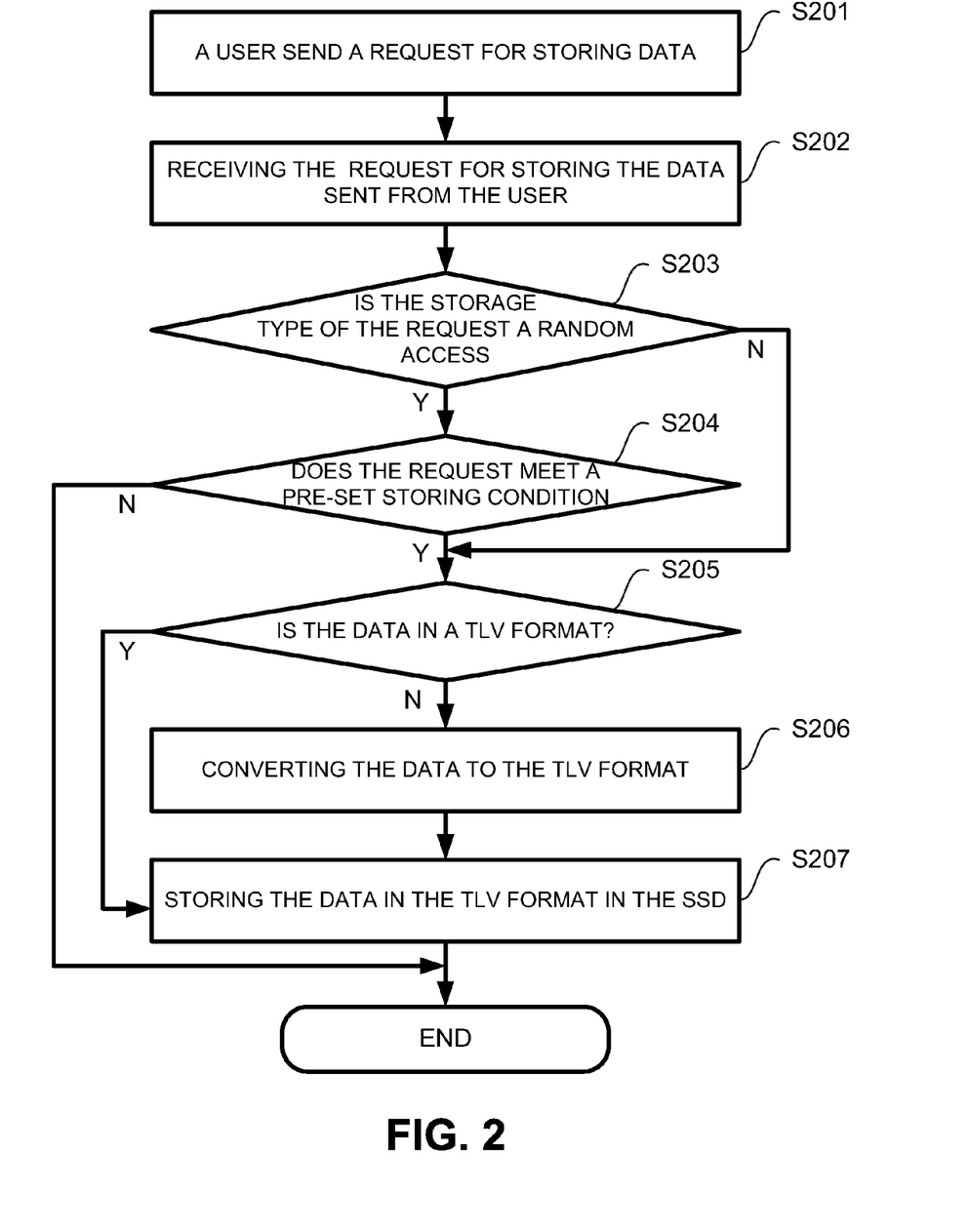
FIG. 2 is a flow chart showing a method for storing data according to another embodiment of the present invention.

Referring to FIG. 2, a method for storing data is shown according to the second embodiment of the invention. The method includes the following steps:

At step S201: a user sends a request for storing data.

Specifically, the request for storing the data sent by the user is employed to store the data of the user. The data includes new data the user generated, or existing data previously uploaded by the user and currently edited, modified, or updated by the user.

For example, a user, through UGC platforms such as intranet, social network, video/audio sharing network and blogs, generates new data, and needs to store the generated data. Then, the user sends a request for storing the generated data. On the other hands, the user may modify or revise the stored data, and need to save the modified data. Then, the user sends a request for storing the modified data.

Preferably, the request for storing the data includes information of the property, format and size of the data. The request for storing the data is defined based on the storing need of data.

At step S202: the request for storing the data sent by the user is received.

At step S203: whether a storage type of the request for storing the data is a random access is determined.

Specifically, the storage type of the request for storing the data is determined. If the storage type of the request for storing the data is the random access, step S204 is executed, while if the storage type of the request for storing the data is not the random access, step S206 is executed.

There are two storage types of data: a random access and a sequential access. When the data for which the user requests for storing is new data generated by the user, the SSD stores the newly generated data in a sequential access manner. Accordingly, the storage type of the request for storing the data is the sequential access. When the data which the user requests for storing is data modified by the user, the SSD needs to find the unmodified data corresponding to the modified data, and replaces the unmodified data with the corresponding modified data. Because the unmodified data can randomly be located in an arbitrary position in the SSD disk, the modified data can also randomly be located in the arbitrary position in the SSD disk. Accordingly, the storage type of the request for storing the data is the random access.

At step S204: whether the request for storing the data meets a pre-set storage condition is determined. If the request for storing the data meets the pre-set storage condition, step S205 is executed, while if the request for storing the data does not meet the pre-set storage condition, the request for storing the data is rejected.

Specifically, the pre-set storage condition is used to avoid a functional bottle-neck problem in the SSD. When the number of requests storing the data received from users to randomly access the data in the SSD exceeds a maximum number of requests for storing the data with which the SSD can process within one period, the functional bottle-neck problem with the random access in the SSD occurs. In order to ensure the stability and reliability of the services, such functional bottle-neck problem in the SSD should be prevented. Therefore, the pre-set storage condition is set to limit the number of random accesses to the SSD. Every time, when a request for storing the data with the storage type of the random access is received, whether the request meets the pre-set storage condition is determined. If the request meets the pre-set storage condition, the step of storing the data in the SSD is executed. Otherwise, the request for storing the data is rejected. Furthermore, by pre-setting different SSD storage conditions, the functional bottle-neck problem with the random access in the SSD can be prevented, so as to improve the stability of the system. It should be appreciated that other storage conditions can also be utilized to practice the invention.

Preferably, the pre-set storage condition can be a maximum number of the request for which the SSD is able to process within one period, i.e., within one period, when the number of the requests for storing the data received from users to randomly access the data in the SSD exceeds the maximum number of the requests with which the SSD can process within the period, the request does not meet the pre-set storage condition. Accordingly, the request for storing the data is rejected. When the request for storing the data meets the pre-set storage condition, the request for storing the data is accepted and executed, and the data is stored in the SSD. In one embodiment, the maximum number of the request for which the SSD is able to process within one period is an integer and not less than 1.

The maximum number of the requests for storing the data can be used to balance the storage efficiency and the storage stability of the SSD. If the maximum number is set to a lower value, the storage stability of the SSD is relatively high while the storage efficiency of the SSD is relatively low. Otherwise, if the maximum number is increased to a higher value, the storage stability of the SSD is decreased while the storage efficiency of the SSD is increased. The maximum number of the request for which the SSD is able to process within one period can be calculated by using mathematical formula or obtained through experiments, thereby resulting in, under the condition of ensuring the stability of the SSD, further improvements of the random storage efficiency of the SSD. It should be appreciated that the maximum number can be obtained by any methods without departing from the spirit and intended scope of the invention.

Specifically, when the pre-set storage condition is set to be the maximum number of the request for which the SSD is able to process within one period, the determination whether the request for storing the data meets the pre-set storage condition is performed as follows:

Determining whether the number of the request for storing the data received within a period is greater than a maximum number of the request for which the SSD is able to process within one period. If the number of the requests for storing data received within the period including the current request for storing the data does not exceed the maximum number, the request for storing the data is considered to meet the pre-set storage condition.

For example, when the maximum number of storing data requests for which the SSD can process within one period is set to be 1, the determination whether the number of the request for storing the data received within the period including the current request for storing the data is greater than a maximum number of the request for which the SSD is able to process within the period is performed as follows: determining whether the current request for storing the data is the first request for storing the data received within the period, if yes, the current request for storing the data meets the pre-set storage condition, and then executing step 205. Otherwise, the current request for storing the data does not meet the pre-set storage condition.

Figure 3:
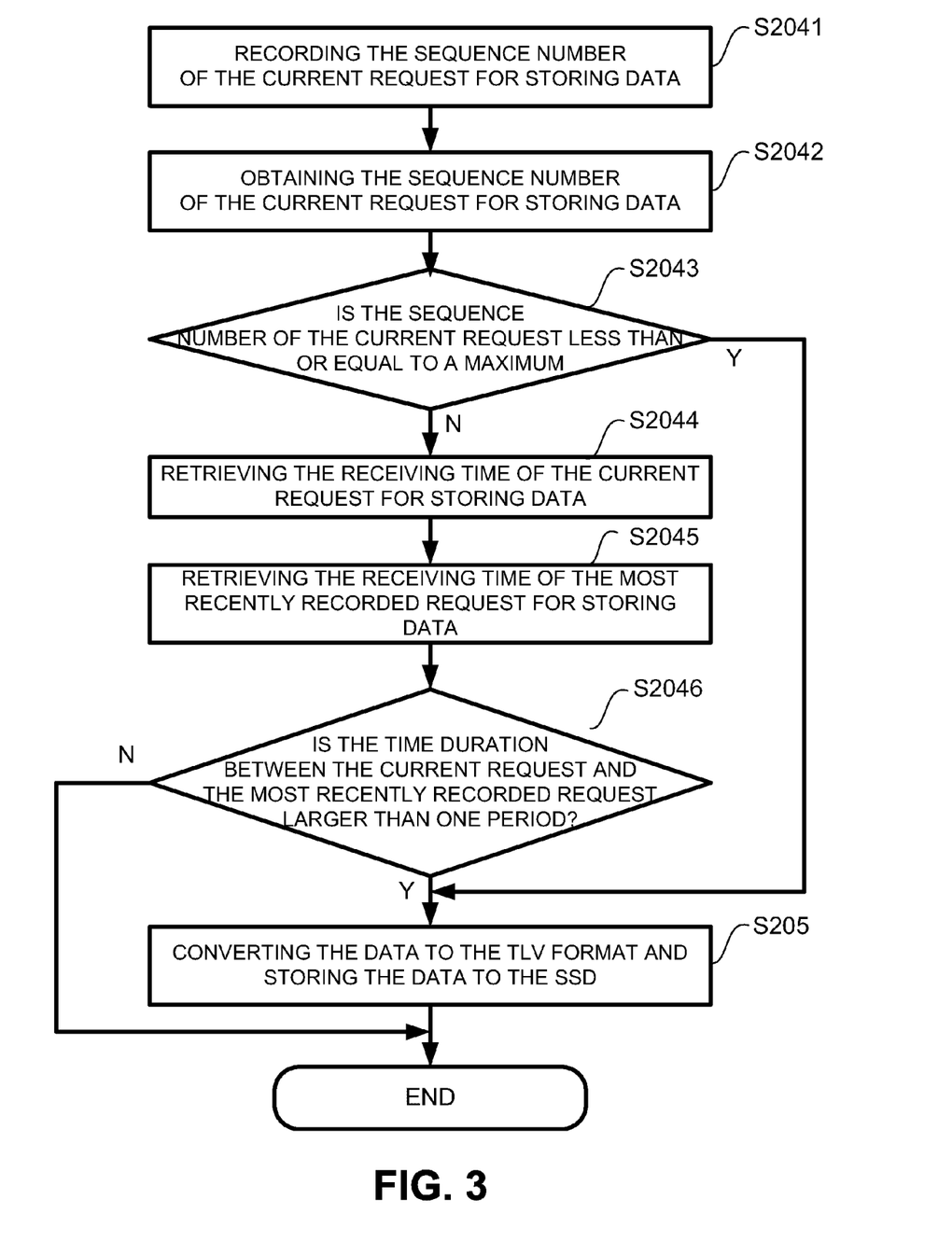
FIG. 3 is a flow chart showing detailed steps to be executed in the step S204 as shown in FIG. 2 for storing data according to one embodiment of the present invention.

When the maximum number of storing data requests for which the SSD can process within one period is set to be 20, the determination whether the number of the request for storing the data received within the period including the current request for storing the data is greater than a maximum number of the requests for which the SSD is able to process within the period is performed as follows: determining whether the current request for storing the data is any one of the first and twentieth requests for storing the data received within the period, if yes, the current request for storing the data meets the pre-set storage condition, and then executing step 204. Otherwise, the current request for storing the data does not meet the pre-set storage condition More preferably, the maximum number of the requests for storing the data for which the SSD is able to process within one period can also be adjusted according to the storage type of the requests. Referring to FIG. 3, in one embodiment, step S204 is performed, but not limited to, as follows:

At step S2041: recording a sequence number of the request for storing the data.

Preferably, the sequence number of the request for storing the data is recorded by a program of a counter. The initial value of the counter is set to be zero. When a request for storing the data is received, the value of the counter is added by one. Repeating this process until the value of the counter is re-set at step S2046, which makes the number of the request for storing the data recorded by the counter is the actual number of the request for storing the data received within one period.

At step S2042: obtaining the sequence number of the request for storing the data. Specifically, the sequence number of the request for storing the data is retrieved from the counter.

At step S2043: determines whether sequence number of the request for storing the data is less than or equal to the maximum number. If yes, the request for storing the data meets the pre-set storage condition, then step S205 is executed. Otherwise, step S2044 is executed.

At step S2044: obtaining the receiving time of the request for storing the data.

At step S2045: obtaining the receiving time of the most recently recorded request for storing the data. Specifically, the most recently recorded request for storing the data is defined as the first request for storing the data within the period.

At step S2046: determining whether the duration between the receiving time of the current request for storing the data and the receiving time of the most recently recorded request for storing the data is larger than one period. If yes, the current request for storing the data meets the pre-set storage condition, then step S205 is executed, and the value of the counter is set to be 1 and the counter program is initialized, and the receiving time of the most recently recorded request for storing the data is modified as the receiving time of the current request for storing the data. If not, the current request for storing the data does not meet the pre-set storage condition, the request for storing data is rejected and the execution is ended.

In one embodiment, the source codes of steps S2043-2046 is listed as follows:

| | | |
|---|---|---|
| gdwRanWriteNum++; | | //record the sequence number |
| | of | |
| | | //the request for storing data. |
| if(gdwRanWriteNum ≤ | | //determine whether the |
| dwMaxAllowRanWrites) | | //sequence number is less than |
| | | //or equal to a maximum value. |
| return 0; | | //the request meets the pre-set |
| | | //storage condition. |
| dwCurTime = time(NULL); | | //retrieve the receiving time of the |
| | | //request for storing data. |

-continued

```
if(dwCurTime −gdwLastTime >T)   //determine whether the duration
                                //between the receiving time of the
                                //current request for storing the data
                                //and the receiving time of the most
                                //recently recorded request for
                                //storing the data is larger than one
                                //period.
{
gdwLastTime = dwCurTime;        //modify the receiving time of the
                                //most recently recorded request for
                                //storing the data as the receiving
                                //time of the current request for
                                //storing the data.
gdwRanWriteNum −>               //set the number of the request for
gdwRanWriteNum = 1;             //storing the data recorded by the
                                //counter as the actual number of
                                //the request for storing the data
                                //received within one period
return 0;                       //the request meets the pre-set
                                //storage condition.
}
return 1;                       //the request does not meet the
                                //pre-set storage condition.
```

Of them,

"gdwRanWriteNum" is the sequence number of the request for storing the data;

"dwMaxAllowRanWrites" is the maximum number of storing data requests for which the SSD can process within one period;

"dwCurTime" is the receiving time of the request for storing the data;

"gdwLastTime" is the receiving time of the most recently recorded request for storing the data;

"return 0" means that the request for storing the data meets the pre-set storage condition; and "return 1" means that the request for storing the data does not meet the pre-set storage condition.

At step S205, whether the data is in a type-length-value (TLV) format is determined. If the data is not in the TLV format, step S206 is executed. Otherwise, if the data is in the TLV format, step S207 is executed.

According to the digital data communication protocol, the data can be configured in a type-length-value (TLV) format. Type field and length field have a fixed data length, which is 1-4 bytes. Value field have a variable data length depending on the size of the data to be stored. The three fields are specified as:

| | |
|---|---|
| Type | one number code to represent the type of the data block; |
| Length | the size of the value field (usually in bytes); and |
| Value | a set of bytes having variable data field and length. |

At step S206: the data is converted into the TLV format.

The step includes determining whether the format of the data is in the TLV format, and if it is not in the TLV format, converting it to the TLV format. It is noted that determining whether the format of the data is in the TLV format is known to one skilled in the art.

At step S207: the data in the TLV format is stored in the SSD. Specifically, the data in the TLV format is stored in the SSD accordingly to the received request.

According to the method provided in the present embodiment of the invention, the data is stored in the SSD in accordance with the request for storing the data, which ensures the consistency of the data storage, and reduces the data redundancy caused employing a cache layer to cache data in the prior art. Further, by using an SSD disk monolayer of storing data, the method according to the present embodiment of the invention avoids increases of external requests and accesses to the data layer caused by data reloading of the cache layer in the event of which the machine (e.g., data storage server) is powered down in the prior art. This simple approach further reduces the complexity of system design and the cost of operation and maintenance.

It should be appreciated that those of skill in the art, in light of the present disclosure, will recognize that numerous modifications can be made without departing from the spirit and intended scope of the invention.

Embodiment 3

Figure 4:
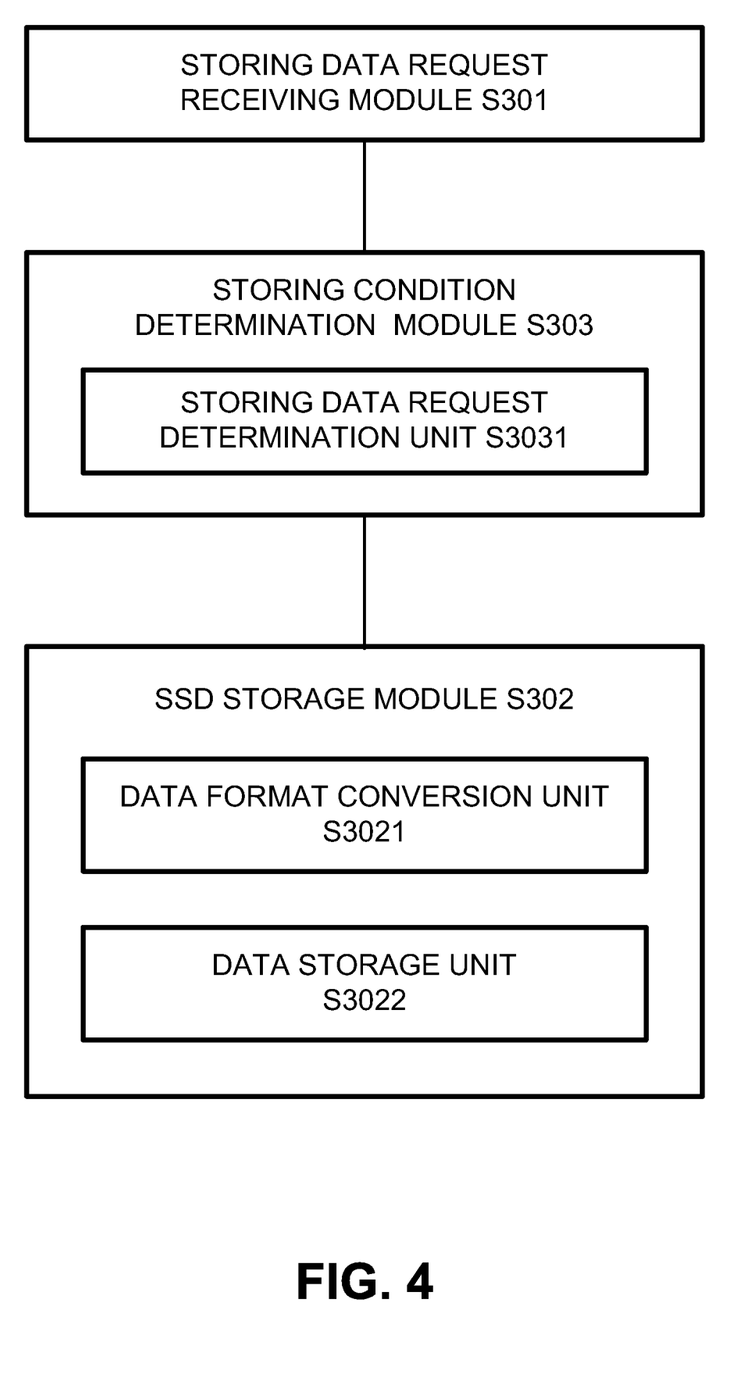
FIG. 4 is a block diagram showing the structure of a device for storing data according to one embodiment of the present invention.

Referring to FIG. 4, a device for storing data is shown according to the third embodiment of the invention.

The device includes a storing data request receiving module S301 adapted for receiving a request for storing data sent by from a user, and an SSD storage module S302 adapted for storing the data in an SSD according to the received request, and The device also includes a storing condition determination module S303 adapted for determining whether a storage type of the request for storing the data is a random access.

If the storage type of the request for storing the data is the random access, the storing condition determination module S303 determines whether the request for storing the data meets a pre-set storage condition. If the request does not meet the pre-set storage condition, the request for storing the data is rejected, and if the request meets the pre-set storage condition, the data is stored in the SSD according to the received request.

If the storage type of the request for storing the data is not the random access, the data is stored in the SSD according to the received request.

The storing condition determination module S303 includes a storing data request determination unit S3021 adapted for, when the pre-set condition is a maximum number of the request for which the SSD is able to process within one period, determining whether the number of the request for storing the data received within the period including the current request for storing the data is greater than the maximum number of the requests. If not, the current request for storing the data meets the pre-set storage condition. In one embodiment, the maximum number of the request for which the SSD is able to process within one period is an integer not less than 1.

The SSD storage module S302 includes a data format conversion unit S3021 adapted for determining whether the data is in a type-length-value (TLV) format, where, if the data is not in the TLV format, the data format conversion unit converts the data into the TLV format, and a data storage unit S3022 adapted for storing the data in the TLV format in the SSD.

According to the device of the invention, the data is directly stored in the SSD according to the received request for storing the data, which ensures the data consistency and reduces data redundancy caused by using a cache layer to cache data in the prior art. Additionally, the use of a single layer of an SSD to store data avoids the need of reloading data in the cache layer once a machine is power-down, and thus avoids increases of external requests and accesses to data layers caused by reloading data, thereby reducing the complexity of system design and the cost of operation and maintenance.

As disclosed above, when describing the exemplary device for storing the data, the device is grouped into the above-disclosed functional modules. It should be appreciated that those of skill in the art, in light of the present disclosure, will recognize that numerous modifications can be made without departing from the spirit and intended scope of the invention.

According to the invention, parts or all of the features of the present disclosure can be implemented by hardware, and program instructions/codes to relevant hardware as well. The program instructions/codes can be stored in a computer readable/writable medium, which includes magnetic disk, CD/DVD, Read-Only Memory or ROM, and Random Access Memory or RAM.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for storing data, comprising the steps of:
   receiving a request for storing data sent by a user; and
   storing the data in a solid state disk (SSD) according to the received request, after the step of receiving the request for storing the data, the method further comprising the steps of:
   determining whether a storage type of the request for storing the data is a random access;
   if the storage type of the request for storing the data is a random access, determining whether the request for storing the data meets a pre-set storage condition;
      if the request does not meet the pre-set storage condition, rejecting the request for storing the data; and
      if the request meets the pre-set storage condition, executing the step of storing the data in the SSD according to the received request; and
   if the storage type of the request for storing the data is not the random access, executing the step of storing the data in the SSD according to the received request.

2. The method according to claim 1, wherein the step of determining whether the request for storing the data meets the pre-set storage condition comprises the step of:
   determining whether a number of the request for storing the data received within a period is greater than a maximum number of the request for which the SSD is able to process within one period, wherein the request for storing the data meets the pre-set storage condition if the number of the request for storing the data received within the period is not greater than the maximum number of the request.

3. The method according to claim 2, wherein the maximum number of the request for which the SSD is able to process within one period is an integer not less than 1.

4. The method according to claim 1, wherein the step of storing the data in the SSD comprises the steps of:
   determining whether the data is in a type-length-value (TLV) format;
   converting the data into the TLV format if the data is not in the TLV format; and
   storing the data in the TLV format in the SSD.

5. A device for storing data, comprising:
   a receiving module adapted to receive a request for storing data sent by from a user;
   an SSD storage module adapted to store the data in an SSD according to the received request; and
   a storing condition determination module adapted to determine whether a storage type of the request for storing the data is a random access,
   wherein if the storage type of the request for storing the data is the random access, the storing condition determination module determines whether the request for storing the data meets a pre-set storage condition, if the request does not meet the pre-set storage condition, rejects the request for storing the data, and if the request meets the pre-set storage condition, stores the data in the SSD according to the received request; and
   wherein if the storage type of the request for storing the data is not the random access, the storing condition determination module stores the data in the SSD according to the received request.

6. The device according to claim 5, wherein the storing condition determination module comprises:
   a storing data request determination unit adapted to determine whether a number of the request for storing the data received within a period is greater than a maximum number of the request for which the SSD is able to process within one period, wherein the request for storing the data meets the pre-set storage condition if the number of the request for storing the data received within the period is not greater than the maximum number of the request.

7. The device according to claim 6, wherein the maximum number of the request for which the SSD is able to process within one period is an integer not less than 1.

8. The device according to claim 5, wherein the SSD storage module comprises:
   a data format conversion unit adapted to determine whether the data is in a type-length-value (TLV) format, wherein, if the data is not in the TLV format, the data format conversion unit converts the data into the TLV format; and
   a data storage unit adapted to store the data in the TLV format in the SSD.

9. A non-transitory computer-readable storage medium storing instructions which, when executed by a processor, cause a device to perform a method for storing data, the method comprising:
   receiving a request for storing data sent by a user; and
   storing the data in a solid state disk (SSD) according to the received request, wherein the method, after the step of receiving the request for storing the data, further comprises the steps of:
   determining whether a storage type of the request for storing the data is a random access;
   if the storage type of the request for storing the data is a random access, determining whether the request for storing the data meets a pre-set storage condition;
      if the request does not meet the pre-set storage condition, rejecting the request for storing the data; and
      if the request meets the pre-set storage condition, executing the step of storing the data in the SSD according to the received request; and
   if the storage type of the request for storing the data is not the random access, executing the step of storing the data in the SSD according to the received request.

10. The non-transitory computer-readable storage medium according to claim 9, wherein the step of determining whether the request for storing the data meets the pre-set storage condition comprises the step of:

determining whether a number of the request for storing the data received within a period is greater than a maximum number of the request for which the SSD is able to process within one period, wherein the request for storing the data meets the pre-set storage condition if the number of the request for storing the data received within the period is not greater than the maximum number of the request.

11. The non-transitory computer-readable storage medium according to claim 10, wherein the maximum number of the request for which the SSD is able to process within one period is an integer not less than 1.

12. The non-transitory computer-readable storage medium according to claim 9, wherein the step of storing the data in the SSD comprises the steps of:

determining whether the data is in a type-length-value (TLV) format;

converting the data into the TLV format if the data is not in the TLV format; and     storing the data in the TLV format in the SSD.

\* \* \* \* \*